United States Patent [19]

Hoag

[11] Patent Number: 4,726,032
[45] Date of Patent: Feb. 16, 1988

[54] COMB-SHAPED POLARIZING DEVICE
[75] Inventor: Ethan D. Hoag, Boston, Mass.
[73] Assignee: Laser Corporation of America, Lowell, Mass.
[21] Appl. No.: 841,766
[22] Filed: Mar. 20, 1986
[51] Int. Cl.$^4$ .......................... H01S 3/10; H01S 3/08; H01S 3/04
[52] U.S. Cl. ..................................... 372/106; 372/35; 372/27; 372/103
[58] Field of Search ................. 372/106, 35, 103, 105, 372/26, 27; 350/370, 407

[56] References Cited

U.S. PATENT DOCUMENTS 3,617,938 11/1971 Denes et al. ........................ 350/370
3,875,529 4/1975 Hintz .................................... 372/106
4,547,651 10/1985 Maruyama .......................... 372/106

Primary Examiner—James W. Davie
Assistant Examiner—Xuan Vo
Attorney, Agent, or Firm—William W. Habelt

[57] ABSTRACT

A comb-shaped polarizing device for use in a laser is compact, inexpensive and easily adjusted. The device includes an annular member having a number of comb-shaped teeth projecting opposite similarly shaped teeth from a rectangular aperture. The comb-shaped teeth are arranged in a plane transversing a laser beam which is under oscillation. Cooling water passages are formed in the annular member. In one embodiment the annular member is provided at its periphery with gear teeth which mate with a motor for selection of the direction of polarization of the laser beam.

8 Claims, 9 Drawing Figures

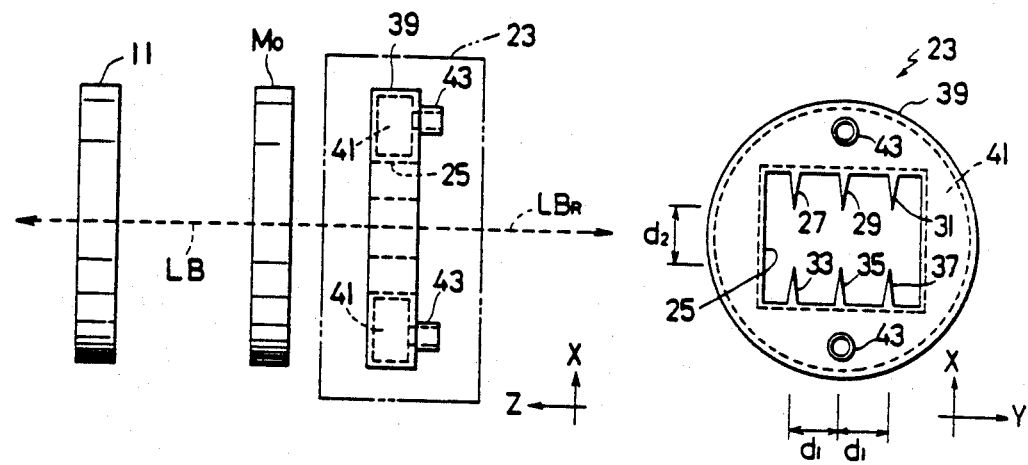
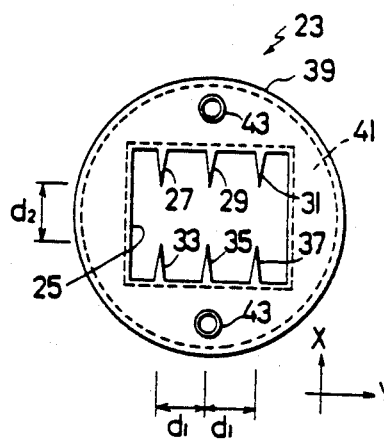
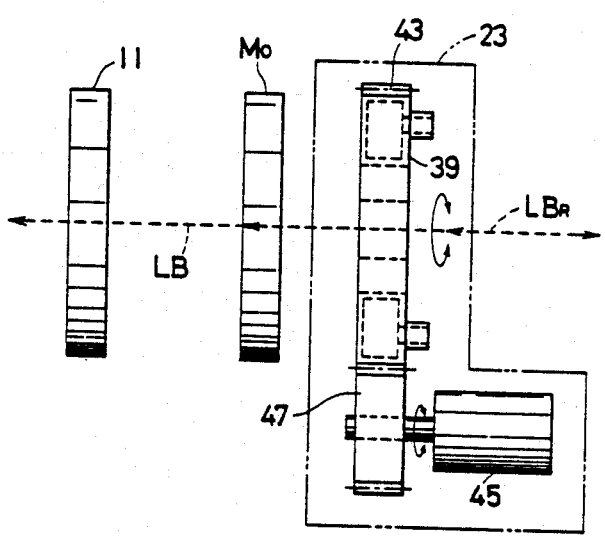
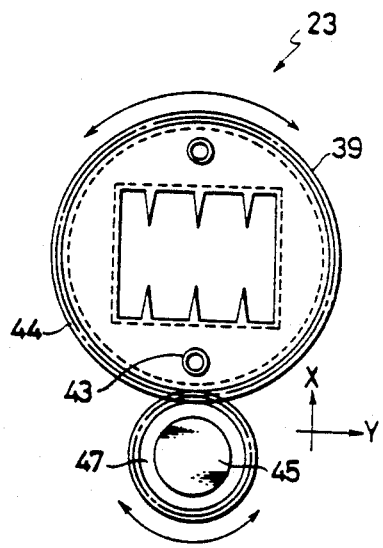

COMB-SHAPED POLARIZING DEVICE

BACKGROUND OF THE INVENTION

This invention relates to a simply-structured comb-shaped polarizing device which can polarize a laser beam.

In a laser oscillating apparatus, there is a case in which it is desired to polarize a laser beam.

Conventionally, for this purpose, for instance, a plane mirror inclined at a 45 degree angle was placed in a light path of a laser beam under oscillation and the laser beam was linearly polarized.

However, in a polarizing device by the above plane mirror, it is necessary that the placement be accurately adjusted so that the input light path to said plane mirror and the output light path from said plane mirror are not out of alignment, and thus it is difficult to design such an apparatus within a limited space and at low cost. Especially, in the case in which an attempt is made to design a laser oscillating apparatus compactly, since a light path is bent perpendicularly, the design becomes difficult.

Also, polarization by a plane mirror polarizes a laser beam in only one direction and thus, the direction of the polarization can not be adjusted.

SUMMARY OF THE INVENTION

The object of this invention is to provide a polarizing device which can be designed within a limited space and at low cost, and which can polarize a laser beam into a desired one.

Another object of this invention to provide a polarizing device in which the direction of the polarization can be adjusted optionally and easily.

In order to attain the above objects, in this invention, a comb-shaped teeth provided with cooling means have been projectingly arranged in a plane transversing a laser beam which is under oscillation.

BRIEF DESCRIPTION OF THE DRAWINGS

FIG. 6 is a front view of an embodiment which shows a comb-shaped polarizing device;

FIG. 7 is the right side view of FIG. 6;

FIG. 8 is a front view of another embodiment which shows a comb-shaped polarizing device; and FIG. 9 is the right side view of FIG. 8.

DETAILED DESCRIPTION OF THE PREFERRED EMBODIMENT

Figure 1:
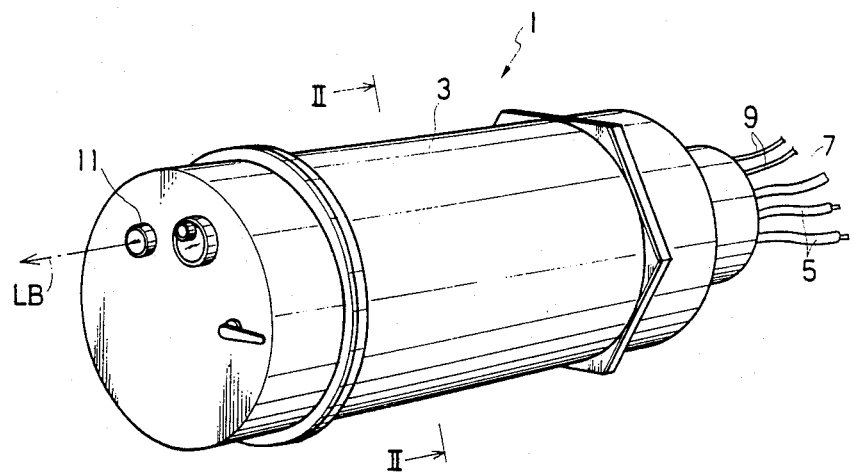
FIG. 1 is a perspective view of a laser oscillating apparatus in which this invention can be embodied.

As shown in FIG. 1, a laser oscillating apparatus 1 is constructed so as to enclose a laser oscillator in a cylindrical laser housing 3. At the right end of the laser housing 3, there are connected electric source cables 5, gas supply tube 7 which injects mixed gas such as of $CO_2$, $H_e$, $N_2$, and cooling water pipe 9 for interior cooling. At the left end of the laser housing 3, an output window 11 for a laser beam is formed.

Figure 2:
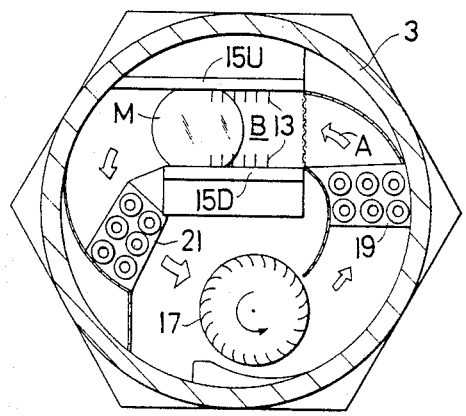
FIG. 2 is an enlarged cross-sectional view taken along the line II—II in FIG. 1.

As shown in FIG. 2, at the upper portion of the inside of the laser housing 3, there is provided an upper and lower pair of discharge electrodes 15U, 15D along the longitudinal direction of the laser housing 3 spaced vertically apart at a predetermined distance, each of said discharge electrodes having a large number of pin-shaped electrodes 13. Below the discharge electrodes 15U, 15D, a blower 17 is provided which produces a counter-clockwise gas flow A as seen in FIG. 2. Heat exchangers 19, 21 are provided between the blower 17 and an lasing cavity B is formed by the previously described upper and lower pair of discharge electrodes 15U, 15D. Flow directing baffles are suitably provided between the blower 17, heat exchangers 19, 21, and the discharge electrodes 15U, 15D for smoothing the gas flow A.

Figure 3:
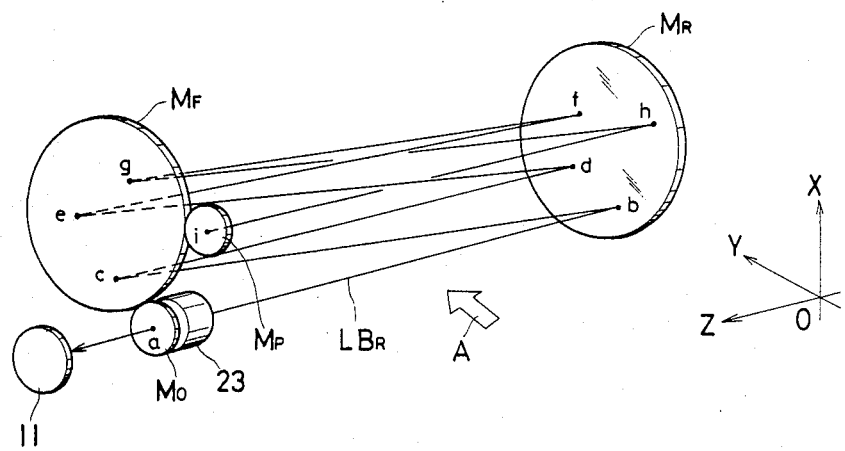
FIG. 3 is a perspective view showing an arrangement of a light beam oscillator.

As shown in FIG. 3, at the inside of both of the longitudinal both ends of said housing 3, comparatively large front folding mirror $M_F$ and rear folding mirror $M_R$ are disposed opposite to one another, said lasing cavity being interposed therebetween. At the vicinity of the edge of the front folding mirror, compartively small primary mirror $M_P$ and output mirror $M_o$ are provided. At the inside of the output mirror $M_o$, there is provided a comb-shaped polarizing device 23. The two folding mirrors $M_F$, $M_R$ and the output mirror $M_o$ are formed flat, and the primary mirror $M_P$ is formed concave. The reflectivity of the primary mirror is approximately 100% and the reflectivity of the output mirror is, for instance, 60% (40% transmittivity).

The respective mirrors $M_F$, $M_R$, $M_P$, $M_o$ are disposed so that the laser beam under resonation passes the points a through i. Point a is the reflecting point of the output mirror, point i is the reflecting point of the primary mirror, points b, d, f, and h are the reflecting points of the folding mirror $M_R$, and points c, e, and g are the reflecting points of the folding mirror $M_F$.

Figure 4:
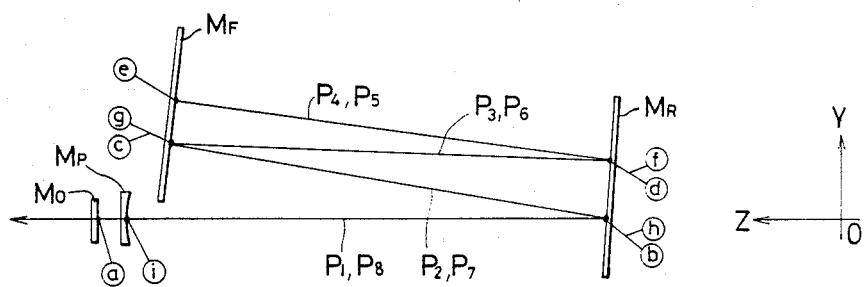
FIG. 4 is an illustrative view of light beam paths of the light beam oscillator shown in a plan view of FIG. 3.
Figure 5:
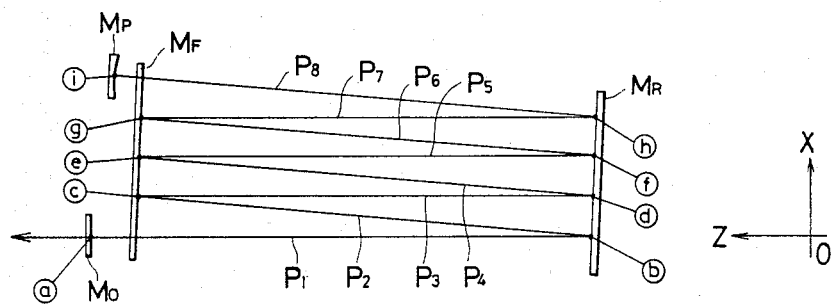
FIG. 5 is an illustrative view of light beam paths of the beam oscillator shown in a front view of FIG. 3.

As shown in FIG. 4 and FIG. 5, the two folding mirrors $M_F$ and $M_R$ are disposed inclined at a predetermined angle on the YZ plane, and also the primary mirror $M_P$ and the output mirror are disposed with a predetermined interval on the X axis.

A laser beam $LB_R$ under resonation passes 8 paths $P_1$–$P_8$ in such a manner as to reciprocate the gas flow axis Y two times while making one reciprocation on the height axis X (electric discharge axis). Namely a laser beam that is reflected at point a, passes paths $P_1$–$P_4$ and gradually takes a higher reflecting position in the order of points b, c, d and e, and at the same time follows the gas flow in the downstream direction. Then, the reflecting positions will be further raised in the order of points f, g, h, and i and will follow the gas flow in the reverse direction. The reflecting points c, e, g and b, d, f, h on the respective folding mirrors $M_F$, $M_R$ will be dispersed by disposed on the plane surface of each mirror and the laser beam under oscillation will pass through a three-dimentional paths $P_1$ through $P_8$.

As shown in FIG. 6 and FIG. 7, the comb-shaped polarizing device 23 is constructed of a copper or an aluminum annular member, said annular member being provided with comb-shaped teeth 27, 29, 31 and comb-shaped teeth 33, 35, 37, which comb-shaped teeth being respectively disposed on opposed surfaces of a rectangular aperture 25. The distance between the teeth is $d_1$, and the distance between the ends of the opposing teeth is $d_2$. In this embodiment, the distance $d_2$ is made somewhat larger than the diameter of a basic mode. The width of the tooth is approximately 1 mm, and the height of the tooth is approximately 3 mm. Cooling water passage 41 is formed inside the annular member 39, and nipples 43 are connected to said passage in order to connect the cooling water piping.

A laser beam $LB_R$ under oscillation which has passed the comb-shaped teeth is polarized at the side surface of the comb-shaped teeth. For a discussion of the theory relating to the polarizing of light on a surface of a substance, reference should be made to "Scattering of Light and Other Electromagnetic Radiation". (M. Kerker, Academic Press, New York, 1969.)

Namely, a laser beam, when passing through the side surface of the comb-shaped teeth as shown in this embodiment, will be polarized, although slightly, and by resonation, its polarization will be gradually increased. And at last, it will be almost completely polarized, and then be output.

Although the comb-shaped teeth 27, 29 . . . 37 will be exposed to the gas flow, since cooling water is flowing in the cooling water passage 41, they will not become heated above a certain temperature.

In FIG. 8, another embodiment of a comb-shaped polarizing device is shown.

The comb-shaped polarizing device 23 shown in this embodiment is provided with gear teeth 44 at the outer peripheral surface of the annular member 39 shown in FIG. 6 and FIG. 7 These are meshed with a gear 47 which is rotated by a motor 45. Thus, the annular member 39 is made to freely rotate around a light path of a laser beam $LB_R$. The nipples 43 and the cooling water piping may be connected using flexible hoses.

According to this device, since the annular member 39 can be rotated by rotating the motor 45, the direction of the polarization can be made to the one desired.

In the above embodiments, those examples in which the comb-shaped teeth are made of metallic materials have been shown. However, this material is not limited to metallic materials, and thus non-metallic materials can be used.

Also, in the above embodiment shown, those in which the comb-shaped teeth having a triangular cross section have been shown. However, this may be of a rectangular cross section.

What is claimed is:

1. A comb-shaped polarizing device for use in a laser beam resonator characterized in that a member having comb-shaped teeth being respectively disposed on opposed surfaces of a rectangular aperture in said member and means for cooling during lasing operation is provided in a plane transversing the laser beam which is under resonation.

2. A comb-shaped polarizing device as claimed in claim 1, in which said comb-shaped teeth are mounted so as to freely rotate around the path of said laser beam.

3. A comb-shaped polarizing device as claimed in claim 1, in which a multiple of said comb-shaped teeth are aligned in one direction and in which cooling water is passed through a base portion of said comb-shaped teeth.

4. A comb-shaped polarizing device as claimed in claim 2, wherein said member having comb-shaped teeth has an annular periphery, and is provided with gear teeth at said annular periphery, said gear teeth meshing with a gear which is driven by a motor, whereby said member may be rotated to select the direction of polarization of said laser beam.

5. A laser oscillating apparatus comprising:
 a. an optical resonator having a plurality of mirrors disposed at opposite ends of a lasing cavity including a comparatively large front folding mirror and a comparatively large rear folding mirror disposed oppositely with the lasing cavity therebetween, a comparatively small totally reflective concave primary mirror and a comparatively small semi-transmissive output mirror, each disposed adjacent the edge of the front folding mirror, the mirrors being disposed with respect to each other so that a laser beam passes under resonation therebetween; and
 b. a comb-shaped polarizing device disposed within the lasing cavity adjacent the output mirror in a plane transversing said laser beam which is under resonation, said comb-shaped polarizing device comprising a member having comb-shaped teeth being respectively disposed on opposed surfaces of a rectangular aperture in said member and means for cooling said member during lasing operation.

6. A laser oscillating apparatus as recited in claim 5 wherein said comb-shaped teeth are mounted so as to freely rotate around the path of said laser beam.

7. A laser oscillating apparatus as recited in claim 6 wherein said member having comb-shaped teeth has an annular periphery, and is provided with gear teeth meshing with a gear which is driven by a motor, whereby said member may be rotated to select the direction of polarization of said laser beam.

8. A laser oscillating apparatus as recited in claim 5 wherein said comb-shaped polarizing device has a multiple of said comb-shaped teeth which are aligned in one direction and in which cooling water is passed through a base portion of said comb-shaped teeth.

* * * * *